June 18, 1929.  S. I. BERGER  1,717,910
SKATE WHEEL
Filed Oct. 10, 1927
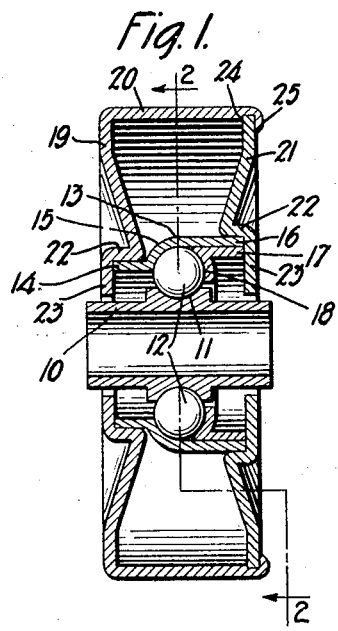
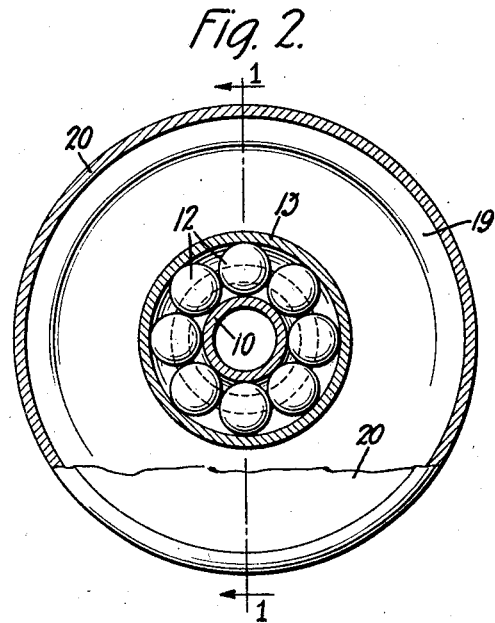
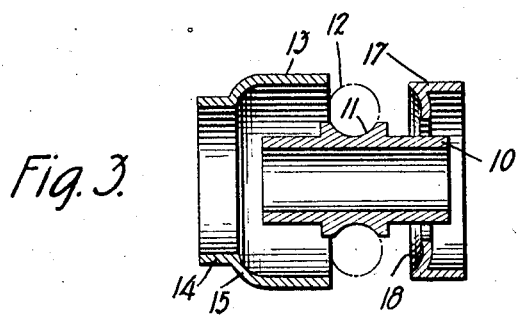
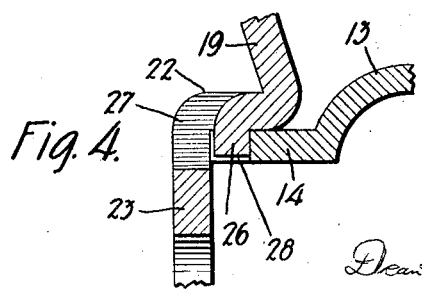
INVENTOR
*Samuel I. Berger.*
BY
ATTORNEYS Patented June 18, 1929.

1,717,910

UNITED STATES PATENT OFFICE.

SAMUEL I. BERGER, OF NEWARK, NEW JERSEY.

SKATE WHEEL.

Application filed October 10, 1927. Serial No. 225,059.

My present invention is primarily directed to anti-friction skate wheels, more especially of the roller bearing type.

It is among the objects of the invention to provide a roller skate wheel comprising a minimum number of parts which may be produced and assembled with facility to provide a rugged structure, attractive in appearance, and which utilizes to best advantage the low friction characteristics of a ball bearing.

Another object is to provide an article of the character set forth which readily admits of the preassembly of the ball bearing structure for convenient embodiment in the wheel.

In the drawings, in which is shown one of various possible embodiments of the several features of the invention, Fig. 1 is a view in longitudinal cross-section of the assembled skate wheel, Fig. 2 is a sectional view taken along the line 2—2 of Fig. 1, Fig. 3 is an exploded view of the bearing structure, and Fig. 4 is a perspective detail of a modification.

Referring now to the drawings, I have shown a skate wheel comprising a central hardened steel axle bushing 10 of conventional construction presenting an inner race 11 for the balls 12 making up the ball bearing. The outer race also of hardened steel comprises the hub sleeve 13 for the wheel, said sleeve of smaller diameter at one end as at 14 to present part 15 of the outer ball race and of larger diameter at 16 and its other end to permit convenient insertion of the balls 12.

For assembly, the balls would be inserted between the two races from the larger end of the hub sleeve, as best shown in Fig. 3. A keeper completes the assembly of the ball bearing structure, said keeper comprising a cylindrical wall 17 friction-fitted into the larger end of the wheel hub sleeve and presenting a toroidal surface 18 constituting the complementary part of the outer ball bearing surface.

The ball bearing structure is thus completely pre-assembled as such, without possibility of the balls dropping out of place from between the races. The friction-fitted keeper 17—18 prevents any separation or movements of the parts other than for the normal operation of the ball bearing.

The outer ball bearing sleeve or wheel hub 13 supports the elements of the wheel proper. Preferably this wheel is composed of two sheet metal parts, a cup 19 having an outer cylindrical surface representing the tread 20 of the wheel and a plate 21 complementary to said cup. Both the cup and the plate are shaped to present each a hub 22 frictionally telescoped over the corresponding end of the hub sleeve 13, the innermost parts 23 of the cup and plate engaging the respective extremities of the wheel hub 13. The edge of the cup 19 is preferably reduced in thickness to present a shoulder 24 against which the periphery of the plate 21 abuts and the edge of the cup is spun over as at 25 to complete the assembly.

In addition or instead of the friction fits of the wheel elements 19 and 21 over the ends of the hub 13, I may provide a key fit as best shown in Fig. 4 in which key lugs 26 struck out of the plates 19 and 21, and bearing slots 27 extend into corresponding notches 28 in the ends of the sleeve 13.

The structure of the wheel proper made up of the wheel hub 13, the cup 19 and the plate 21, is inherently of great strength, even though the cup and the plate be made of thin sheet metal, since the shaping of these parts and their secure fit over the hub sleeve afford a beam-like cross-section of substantial stiffness. The weight carried in use upon the tread is sustained at the ends and upon a substantial length of the long hub sleeve 13 so that the wheel structure is stronger and more stable than if sustained upon a hub or support of small width.

Not only does the rigid wheel structure revolve freely upon the balls, but said structure is free to rock slightly to the left and right about the ball race, to relieve the strain upon the ankle in turning a curve, or in passing over an uneven roadway.

It will thus be seen that there is herein described apparatus in which the several features of this invention are embodied, and which apparatus attains the various objects of the invention and are well suited to meet the requirements of practical use.

As many changes could be made in the above apparatus, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. A ball bearing skate wheel comprising a pre-assembled ball bearing structure including an axle bushing comprising the inner race thereof, and a wheel hub comprising the outer race thereof, said wheel hub being of diameter at one end sufficient to permit insertion of the balls and of smaller diameter at the other end, a keeper within the larger end of the hub to retain the balls in place therein, and a wheel structure comprising a pair of elements firmly telescoped over the respective ends of the wheel hub, one of said elements forming the tread of the wheel and spun at its edge over the edge of the other of said elements.

2. A ball bearing roller skate wheel comprising an axle bushing comprising an inner ball race, a wheel hub presenting part of an outer ball race near one end thereof and of diameter sufficiently large at one end thereof to permit insertion of the balls, a keeper friction-fitted in said hub and presenting part of the outer race of said balls, a cup having a hub structure firmly telescoped over one end of said hub sleeve, with its innermost part engaging said end of said hub, a disk having a hub structure firmly telescoped over the other end of said sleeve and with its innermost part engaging said end of said hub, said cup forming the tread of the wheel and spun over the periphery of said disk.

3. A roller skate wheel comprising a pre-assembled ball bearing including an axle bushing comprising the inner race, a wheel hub sleeve presenting part of the outer ball race and of diameter sufficiently large at one end thereof for admission of the balls, a keeper friction-fitted into said larger end and presenting part of the outer ball race, a wheel structure comprising a sheet metal cup and a sheet metal plate, each having an inner circular hub formation friction-fitted over the corresponding end of the hub sleeve, the innermost parts of said cup and plate engaging the respective end edges of said hub sleeve, said cup including a tread spun over the periphery of said plate to complete the assembly.

Signed at Newark, in the county of Essex and State of New Jersey this 7th day of October, A. D. 1927.

SAMUEL I. BERGER.